Sept. 1, 1936. D. B. D. BLAKE Re. 20,084

SHOCK ABSORBER

Original Filed May 23, 1930

Inventor:
Dennis B. D. Blake

By Keith, Hilben, Davis & Macauley
Attys

Reissued Sept. 1, 1936

Re. 20,084

UNITED STATES PATENT OFFICE 20,084

SHOCK ABSORBER

Dennis B. D. Blake, Danville, Ill., assignor, by direct and mesne assignments, to General Motors Corporation, Detroit, Mich., a corporation of Delaware Original No. 1,890,311, dated December 6, 1932, Serial No. 454,895, May 23, 1930. Application for reissue January 2, 1934, Serial No. 704,986

34 Claims. (Cl. 188—88)

My invention relates to shock absorbers of the hydraulic type for vehicular adaptation and is concerned more particularly with devices of this nature which are arranged to interpose a predetermined braking resistance to the yielding and rebound movements of a spring as the vehicle moves over a roadway, the resistance offered being preferably less for the yielding than for the rebound movement and the parts being susceptible of calibration to establish any desired ratio of these resistances.

One object of the invention is to devise a shock absorber of the character described in which the valving of the liquid to control its flow in opposite directions is accomplished by valve members in the form of disks having designated shapes and arrangement of openings, the nature of the disks being such that a single disk may be employed under given conditions, or two disks placed in cooperative relation with coacting sets of openings to achieve the desired control, or under other conditions, the valving may be effected by a cooperative group comprising the single disk disposed in spaced relation to the two coacting disks.

A further object is to devise a shock absorber as above described which is characterized by a valving arrangement which may be readily modified to meet a variety of operating conditions, and is further featured by a simplicity in design which is reflected in low manufacturing and maintenance costs.

These and further objects of my invention will be set forth in the following specification, reference being had to the accompanying drawing, and the novel means by which said objects are effectuated will be definitely pointed out in the claims.

For purpose of illustration, my improved valve members, which constitute the principal feature of the present invention, are shown in a shock absorber of the double acting type and in an arrangement comprising a pair of such members disposed at one point in the absorber and a single valve member disposed in another, the three valve members cooperating to achieve the desired control on the fluid during the operation of the device. However, it will be understood that, under certain conditions, only a single member may be employed, while under other circumstances, only the two, immediately coacting members may be employed alone as a group.

Figure 1:
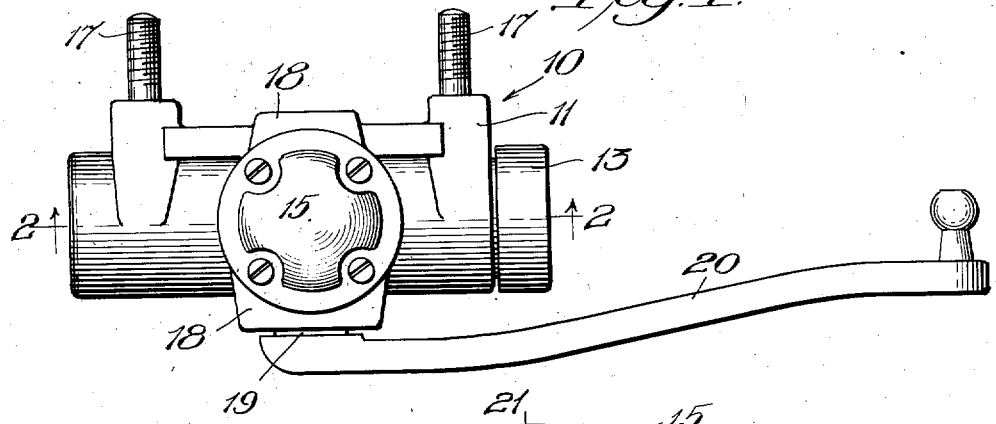
Figure 1 is a plan view of one form of my improved shock absorber as it appears in use on a vehicle.

Referring to Fig. 1, the numeral 10 designates the type of shock absorber shown, which comprises a casing 11 whose vertical section, as viewed along the line 2—2 in Fig. 1, is generally that of an inverted T, the end of the left branch of the T being closed as at 12 and the end of the right branch of the T being closed by a cap 13. The vertical portion 14 of the T may be enclosed by a cover plate 15 having interposed therebetween and the casing 11, a gasket 16. Suitable studs 17 may be used to attach the casing 11 to a convenient portion of the vehicle chassis.

Rotatably mounted within the portion 14 in journals 18—18 formed on opposite sides thereof, is a rock shaft 19 which extends forwardly of and through the casing 11 for attachment on the outside thereof to one end of a lever 20, the opposite end of which may be suitably fashioned for attachment to any desired type of linkage or other connecting feature, whereby the lever 20 may be actuated from the axle. Intermediate the journals 18—18, the shaft 19 has secured thereto a lever 45 by means of a plug 21 and the lower end of said lever extends downwardly within the lower portion of the casing 11 and is suitably rounded, or ball-shaped, as at 21 for reception within a similarly shaped socket 22 provided in a piston 23. The piston 23 extends in opposite directions from the lower end of the lever 20 and the opposite ends of said piston define with the adjacent ends of the casing 11 brake chambers 24 and 25, respectively, the space within the vertical portion 14 above the piston serving as a reservoir for the braking fluid.

Figure 2:
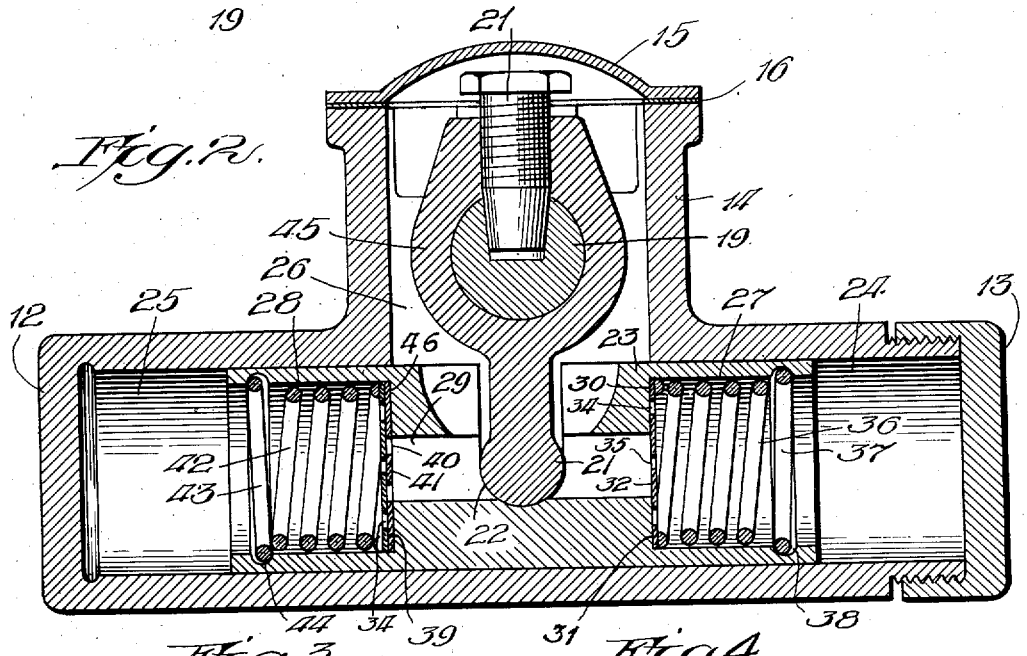
Fig. 2 is an enlarged section along the line 2—2 in Fig. 1, looking in the direction of the arrows.
Figure 3:
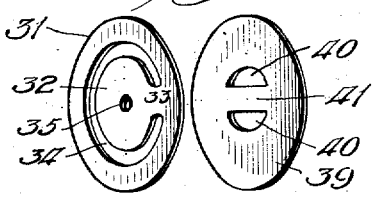
Fig. 3 is a perspective view showing the valve members, slightly spaced from each other, which are utilized to control the flow of fluid during the rebound action of the spring.
Figure 4:
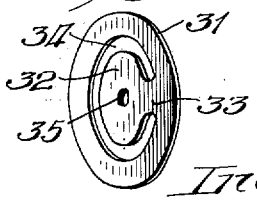
Fig. 4 is a perspective view of the valve member at the opposite end of the shock absorber which controls the fluid flow during the yielding movement of the vehicle spring.

As viewed in Fig. 2, the right end of the piston 23 is provided with a bore 27 which is coaxial with the longitudinal axis of said piston and which extends inwardly from the right end thereof for a predetermined distance. Similarly, the left end of said piston is provided with a bore 28 which is also coaxial with the longitudinal bore of said piston and extends inwardly for a predetermined distance from said end. The bores 27 and 28 are placed in communicating relation by means of a passage 29 having a smaller diameter than either of said bores and whose junction with the bore 27 defines a shoulder 30 and with the bore 28 a shoulder 46.

Seated against the shoulder 30 is a valve disk 31 having within the margin thereof a flap 32 which is connected to the remainder of the disk by a segment 33 and separated at all other points by a parti-annular slot 34, the width of the segment 33 being only sufficient to connect said flap to the remainder of the disk, but without disturbing its capacity for being moved out of the plane of said disk as hereinafter described. The flap 32 has sufficient diameter to also seat against the shoulder 30 and is provided with a central, restricted aperture 35 for a purpose hereinafter explained, said aperture being preferably coaxial with the longitudinal axis of the piston 23 and accordingly with that of the passage 29. One end of a coil spring 36 is always in engagement with one side of the disk 33 exteriorly of the parti-annular slot 34 for the purpose of maintaining said disk against the shoulder 30, and at the opposite end of said spring, the outer coil 37 is slightly enlarged in diameter for locking reception within an annular groove 38 provided in the bore 27.

Seated against the shoulder 46 is a disk 39 having a pair of segmental passages 40 extending therethrough and separated by a strip 41, the distance between the remote sides of the passages 40 across the width of said strip being preferably not greater than the diameter of the passage 29 for a purpose hereinafter explained, and the width of said strip being larger than the diameter of the aperture 35. A disk 31 is seated against the outer face of the disk 39 and both of said disks are retained in the position shown in Fig. 2 by the inner end of a coil spring 42 whose outer coil 43 is slightly enlarged in diameter for locking reception within an annular groove 44 provided in the bore 28. It is contemplated that the disks 31 and 39 will be formed of sheet metal having sufficient resiliency so that the flap 32 may, when actuated by sufficient pressure, bend out of the plane of the disk 31 and, when said pressure is removed, will resume its normal position. Similarly, the strip 41 will have sufficient resiliency to bow slightly out of the plane of the disk 39 when actuated by a pressure operating through the adjacent aperture 35 and to return to its normal position when said pressure is removed.

In discussing the operation of my improved shock absorber, it will be assumed that the reservoir 26 and the brake chambers 24 and 25 are filled with an adequate supply of fluid. When the vehicle is at rest or moving along a substantially level roadway, the lever 20 and accordingly the piston 23 will occupy the symmetrical position shown in Figs. 1 and 2, but when a wheel of the vehicle has dropped into a hole or has ridden over a raised portion of the roadway, the accompanying movement of the axle, to which the end of the lever 20 is connected, in conjunction with the weight of and load on the vehicle, will cause a yielding movement of the spring and a consequent actuation of the ball end 21 of the lever 20 in a counterclockwise direction, thus moving the piston 23 toward the right, as viewed in Fig. 2. This movement of the piston 23 creates a definite pressure on the fluid within the chamber 24, dependent upon the speed of the movement, and the pressure so established seats the flap 32 against the shoulder 30 to thereby cause a restricted flow of some extent through the aperture 35 into the passage 29. At the left end of the piston 23, the fluid pressure in the passage 29 operating through the openings 40 will cause a movement of the adjacent flap 32 away from contact with the disk 39, thereby providing for a relieving flow of the fluid into the brake chamber 25.

Upon the completion of the yielding movement of the spring, the rebound movement of the same, which is more violent than its initial displacement, must accordingly be restrained to a greater extent than that necessary during the yielding movement. Under these conditions, the piston 23 is actuated toward the left, as viewed in Fig. 2, so that the pressure established in the braking chamber 25 immediately seats the flap 32 of the left hand disk 31 against the disk 39, thereby closing the openings 40 in said disks and confining the flow to that obtainable through the aperture 35 in the left hand disk 31, which is covered by the resilient strip 41. This strip accordingly bows out of the plane of the disk 39 toward the right, as viewed in Fig. 2, a sufficient amount to permit a flow through said aperture, dependent upon the speed of movement of the piston 23. At the right end of the piston 23, the pressure in the passage 29 moves the flap 32 towards the right to provide for a relieving flow through the right disk 31.

From the foregoing, it will be understood that, during the yielding movement of the spring, the resistance offered by the shock absorber is that obtainable by the resistance offered to the passage of the fluid from the brake chamber 24 through the aperture 35, this aperture being susceptible of calibration to provide any degree of resistance, dependent upon the operating conditions. During the rebound movement of the spring, the resistance offered is that obtained by a confinement of the flow through the left hand aperture 35 as restricted by the resilient strip 41, and this aperture, as well as the resilience of the strip 41 may be arranged to give any desired braking effect.

It is considered to be within the range of the present invention to not only employ the valve disks 31 and 39 in the manner above described, but that a single valve disk 31 may be employed to control the fluid flow by suitably calibrating the aperture 35. Likewise, it is deemed possible to employ the grouping of the two disks 31 and 39, as shown at the left end of the piston 23, to handle other types of braking resistances, so that no restrictive interpretation is to be placed upon the arrangement of valve disks which has been more particularly described above.

One of the most important advantages of a shock absorber construction which utilizes a valving arrangement as above described is that the operation of the device is substantially independent of any changes which may occur in the viscosity of the oil or other liquid which may be used as the braking medium. These changes are brought about by climatic variations in temperature and also to some extent by the frictional heating due to the movement of the shock absorber parts and the movement of the liquid. Under these conditions it is desirable that the effective areas of the flow controlling ports be susceptible of variation according to the varying pressures which may obtain in the shock absorber at any given time due to changes in the viscosity of the liquid. It will be readily understood that this desirable result can be attained by the use of the valve discs noted above, as the extent of deflection of their movable parts varies directly with the degree of pressure operating thereagainst.

While I have shown one set of elements and combinations thereof for effectuating my improved shock absorber, it will be understood that the same is intended for purpose of illustration only and in nowise to restrict my device to the exact forms and structures shown, for many changes may be made therein without departing from the spirit of my invention.

I claim:

1. In a fluid flow shock absorber, the combination of a support having a passage therethrough, and a valve disk associated with said support having a flap cut from said disk within the margin thereof and joined to said disk by a connecting segment, said flap having an opening therethrough and movable out of the plane of said disk by a fluid pressure established on one side of said support to permit a flow through said passage and seated against said support by a fluid pressure established on the opposite side thereof to permit a smaller flow through said opening.

2. In a fluid flow shock absorber, valve means comprising a pair of cooperating disk members, one of said members having a yieldable portion provided with a restricted opening therethrough and the other of said members being cut out within its margin to provide a passage therethrough larger than said restricted opening and a yieldable strip bridged between the opposite sides of said passage to cover said restricted opening, said yieldable portion being movable by a fluid pressure established on one side of said valve means operating through said passage to permit a flow therethrough and returned by a fluid pressure established on the opposite side of said valve means to permit a smaller flow through said restricted opening against the resistance offered by said yieldable strip.

3. In a fluid flow shock absorber, valve means comprising a pair of cooperating valve disks, one of said disks having a flap cut from said disk within the margin thereof and joined to said disk by a connecting segment, said flap having a restricted opening therethrough, and the other of said disks being cut out within its margin to provide a passage therethrough larger than said restricted opening and a yieldable strip bridged between the opposite sides of said passage to cover said restricted opening, said flap being movable out of the plane of its disk by a fluid pressure established on one side of said disk operating through said passage to permit a flow therethrough and seated in the plane of its disk by a fluid pressure established on the opposite side of said disk to permit a smaller flow through said restricted opening against the resistance offered by said yieldable strip.

4. In a fluid flow shock absorber, the combination of a valve disk having an opening bridged by a yieldable strip, a second valve disk cooperating with said first valve disk and having a flap covering said opening and a restricted opening covered by said strip, said flap opening to permit flow in one direction and closing in the opposite direction to confine the flow through said restricted opening against the resistance offered by said strip.

5. In a fluid flow shock absorber, the combination of a resilient metal valve disk having an opening bridged by an integral, yieldable strip, a second resilient metal valve disk cooperating with said first valve disk and having an integral flap covering said opening and a restricted opening covered by said strip, said flap opening to permit flow in one direction and closing in the opposite direction to confine the flow through said restricted opening against the resistance offered by said strip.

6. In a fluid flow shock absorber, the combination of a casing, a piston having an opening therethrough reciprocable in said casing, and a valve disk having a yieldable flap covering said piston opening with a restricted opening disposed within the margin of said flap, said flap opening to permit flow in one direction and closing in the opposite direction to confine the flow through said restricted opening.

7. In a fluid flow shock absorber, the combination of a casing, a piston having an opening therethrough reciprocable in said casing, a valve disk having an opening bridged by a yieldable strip, said disk opening communicating with said piston opening, a second valve disk cooperating with said first valve disk and having a flap covering said first disk opening and a restricted opening covered by said strip, said flap opening to permit flow in one direction and closing in the opposite direction to confine the flow through said restricted opening against the resistance offered by said strip.

8. In a fluid flow shock absorber, the combination of a casing, a piston having an opening therethrough reciprocable in said casing, a valve disk having a yieldable flap covering said piston opening with a restricted opening communicating with said piston opening and disposed within the margin of said flap, a second valve disk cooperating with the opposite end of said piston opening and having an opening communicating with said piston opening and bridged by a yieldable strip, a third valve disk cooperating with said second valve disk and having a flap covering said second disk opening and a restricted opening covered by said strip, the flap of said first valve disk and the flap of said third valve disk closing and opening, respectively, during the yielding movement of the vehicle spring to thereby confine the fluid flow through the restricted opening of said first valve disk, and said flap of said first valve disk and said flap of said third valve disk opening and closing, respectively, during the rebound movement of the vehicle spring to thereby confine the fluid flow through the restricted opening of said third valve disk against the resistance offered by said yieldable strip.

9. In a fluid flow shock absorber, valve means comprising a pair of cooperating valve members, one of said members having a yieldable portion provided with a restricted opening therethrough and the other of said members having a passage therethrough larger than said restricted opening and a yieldable member bridged across said passage to cover said restricted opening, said yieldable portion being movable in an opening direction by a fluid pressure established on one side of said valve means operating through said passage to permit a flow therethrough and returnable to a closed position by a fluid pressure established on the opposite side of said valve means to permit a smaller flow through said restricted opening against the resistance offered by said yieldable member.

10. In a fluid flow shock absorber, the combination of a valve member having a central opening bridged by a yieldable part, a second valve member cooperating with said first valve member having a yieldable portion covering said opening and a restricted opening covered by said yieldable part, said yieldable portion opening to permit flow in one direction and closing in the opposite direction to confine the flow through said restricted opening against the resistance offered by said yieldable part.

11. In a fluid flow shock absorber, the combination of a casing, a shiftable member having an opening therethrough mounted in said casing, a valve member having a yieldable portion larger than said opening with a restricted opening therethrough communicating with the opening in said shiftable member, a second valve member disposed adjacent said first valve member and having an opening communicating with the opening in said shiftable member and bridged by a yieldable part, a third valve member cooperating with said second valve member and having a yieldable portion larger than the opening in said shiftable member and a restricted opening covered by the yieldable part in said second valve member, the yieldable portions on said first and third valve members closing and opening, respectively, during the yielding movement of the vehicle spring to thereby confine the fluid flow through the restricted opening of said first valve member, and said yieldable portions opening and closing, respectively, during the rebound movement of the vehicle spring to thereby confine the fluid flow through the restricted opening of said third valve member against the resistance offered by the yieldable part of said second valve member.

12. In a fluid flow shock absorber, valve means comprising first and second cooperating disk members, and a third disk member associated therewith, said first member having a yieldable portion provided with a restricted opening therethrough and said second member being cut out within its margin to provide a passage therethrough larger than said restricted opening and a yieldable strip bridged between the opposite sides of said passage to cover said restricted opening, and said third member having a yieldable portion provided with a restricted opening disposed within the margin of said portion, the yieldable portions of said first and third members opening and closing, respectively, during the yielding movement of the vehicle spring to thereby confine the fluid flow through the restricted opening of said third member, and the yieldable portions of said first and third members closing and opening, respectively, during the rebound movement of the vehicle spring to thereby confine the fluid flow through the restricted opening of said first member against the resistance offered by said yieldable strip.

13. In a fluid flow shock absorber, valve means comprising first and second cooperating valve disks, and a third valve disk associated therewith, said first disk having a flap including a restricted opening therethrough cut from within the margin of the disk and joined thereto by a connecting segment, said second disk being cut out within its margin to provide a passage therethrough larger than said restricted opening and a yieldable strip bridged between the opposite sides of said passage to cover said restricted opening, and said third disk having a flap including a restricted opening therethrough cut from within the margin of the disk and joined thereto by a connecting segment, the flaps of said first and third disks opening and closing, respectively, during the yielding movement of the vehicle spring to thereby confine the fluid flow through the restricted opening of said third disk, and the flaps of said first and third disks closing and opening, respectively, during the rebound movement of the vehicle spring to thereby confine the fluid flow through the restricted opening of said first disk against the resistance offered by said yieldable strip.

14. In a fluid flow shock absorber, the combination of a support having a passage therethrough and a shell portion provided with a groove, a valve member seated on said support within said shell portion and having a yieldable part covering said passage and a restricted opening within the margin of said part communicating with said passage, said part opening to permit flow in one direction and seating in the opposite direction against said support to confine the flow through said restricted opening, and a spring for maintaining said member seated against said support, a coil of said spring being receivable in said groove to maintain said spring in position.

15. In a fluid flow shock absorber, a valve structure comprising a pair of disks of resilient material in contact with each other, one of said disks being cut out to form a resilient flap having a perforation therein and the other of said disks having an opening in registry with the flap of the first mentioned disk and an integral member extending into said opening and registering with the perforation in the flap of the first mentioned disk.

16. In a fluid flow shock absorber, a valve structure comprising a pair of disks in contact with each other, one of said disks having an internal flap with a perforation therein and the other of said disks having an opening in registry with said flap and a bridge member in registry with the perforation in said flap.

17. In a fluid flow shock absorber, a valve structure comprising a pair of thin contacting valve members composed of resilient material, one of said members having a passage therethrough and being movable to an open position in response to pressure on one side of said structure, and the other of said members covering said passage in seating relation to said first named member and movable to an open position when pressure is established on the opposite side of the valve structure to thereby move said first named member to a closed position.

18. In a fluid flow shock absorber, the combination of a casing, a piston having an opening therethrough reciprocable in said casing, and a valve structure carried by said piston comprising a first valve member covering said piston opening and having a passage therethrough for communicating with said piston opening, and a second valve member, said members being composed of thin resilient material and located to place said second member in closing relation to said passage, pressure on one side of the valve structure established by a movement of the piston moving said first member away from its associated seat and pressure on the opposite side shifting said first member to a closed position and said second member to an open position to permit flow through said passage against the resistance of said second member.

19. In a fluid flow shock absorber, a valve structure comprising a pair of plate members in face to face surface contact with each other, one of said members having an opening therethrough and being movable from a closed position to an open position in response to fluid pressure on one side of said structure and the other of said members having a portion thereof covering said opening and movable to an open position by pressure on the opposite side of said structure which acts through said opening and which tends to move said one member to its closed position.

20. In a fluid flow shock absorber, a valve structure comprising a pair of plate members in contact with each other, one of said members having an opening therethrough and being movable from a closed position to an open position in response to fluid pressure on one side of said structure and the other of said members being a disk having a thin flexible portion covering said opening and adapted to be flexed to open position by pressure on the opposite side of said structure which acts through said opening and which moves said one member to its closed position.

21. In a fluid flow shock absorber, the combination of a part having a passage therein and a seat around said passage, and a valve structure controlling said passage, said structure comprising a pair of plate members in contact with each other, one of said members having an opening therethrough and being movable away from said seat in response to fluid pressure on one side of the structure and the other of said members having a portion thereof covering said opening and movable away from said one member by fluid pressure on the opposite side of said structure acting through said opening.

22. In a fluid flow shock absorber, the combination of a part having a fluid passage therein, a valve structure for controlling said passage comprising a pair of plate members in face to face surface contact with each other, one member having an opening therein and the other member being a disk having a flexible portion overlying said opening to control the same, and a seat on said part with which said structure cooperates, whereby fluid pressure acting on one side of the structure causes said one member to be moved to an open position and fluid pressure acting subsequently on the other side of the structure causes said one member to be moved to its closed position while said flexible portion is sprung away from said opening by the fluid acting therethrough.

23. In a fluid flow shock absorber, the combination of a movable piston having a passage therethrough and a seat around said passage, and a valve structure controlling said passage, said structure comprising a pair of plate members in contact with each other, one of said members having an opening therethrough and being movable away from said seat in response to fluid pressure on one side of the structure and the other of said members having a portion thereof covering said opening and movable away from said one member by fluid pressure on the opposite side of said structure acting through said opening.

24. In a fluid flow shock absorber, the combination of a movable piston having a fluid passage therethrough, a valve structure for controlling said passage comprising a pair of plate members in face to face surface contact with each other, one member having an opening therein and the other member being a disk having a flexible portion overlying said opening to control the same, and a seat on said piston with which said structure cooperates, whereby fluid pressure acting on one side of the structure causes said one member to be moved to an open position and fluid pressure acting subsequently on the other side of the structure causes said one member to be moved to its closed position while said flexible portion is sprung away from said opening by the fluid acting therethrough.

25. In a double acting, fluid flow shock absorber of the vehicle type, the combination of a fluid-containing chamber, a piston operable in said chamber in response to up and down movements of the vehicle wheels for subjecting the fluid to pressure, means providing a transfer passage through which fluid is displaced by operation of the piston, and flow control means associated with said passage for regulating the transfer of fluid therethrough, said control means including means for restricting the transfer of fluid through said passage in one direction and a valve plate having a relatively thin flexible part adapted to function as a check valve element, said flexible part having an opening therein for restricting the transfer of fluid through said passage in the opposite direction.

26. In a double acting, fluid flow shock absorber of the vehicle type, the combination of a fluid-containing chamber, a piston operable in said chamber in response to up and down movements of the vehicle wheels for subjecting the fluid to pressure, said piston having a transfer passage through which fluid is displaced by operation of the piston and flow control means associated with said piston passage for regulating the transfer of fluid therethrough, said control means including means for restricting the transfer of fluid through said passage in one direction and a valve plate having a relatively thin flexible part adapted to function as a check valve element, said flexible part having an opening therein for restricting the transfer of fluid through said passage in the opposite direction.

27. In a fluid flow shock absorber, the combination of a support having a passage therein and a seat associated with said passage, means operable to displace fluid through said passage, and a valve disk associated with said support and having a yieldable flap provided with a restricted opening therethrough, said flap being adapted to be moved away from said seat by a flow of fluid in one direction through said passage and adapted to be moved against said seat by fluid pressure on the other side of the valve disk whereby the flow in the opposite direction is restricted solely by said opening.

28. In a fluid flow shock absorber, the combination of a housing having a fluid-containing chamber therein, a piston operable in said housing for subjecting the fluid to pressure, said piston having a transfer passage through which fluid is displaced by operation of the piston and a seat associated with said passage, and a valve disk on said piston having a yieldable flap provided with a restricted opening therethrough, said flap being movable away from said seat by a flow of fluid through said passage in one direction and adapted to be moved against said seat by fluid pressure on the other side of the valve disk whereby the flow in the opposite direction is restricted solely by said opening.

29. In a fluid flow shock absorber of the vehicle type, the combination of a fluid-containing chamber, a piston operable in said chamber in response to up and down movements of the vehicle wheels for subjecting the fluid to pressure, means providing a transfer passage through which fluid is displaced by operation of the piston, and flow control means associated with said passage for regulating the transfer of fluid therethrough in one direction comprising a pair of plate members in face to face surface contact with each other, one of said members having an opening therethrough and the other member having a portion covering said opening and movable to an open position by pressure operating through the opening to thereby connect the opening and passage.

30. In a fluid flow shock absorber of the vehicle type, the combination of a fluid-containing chamber, a piston operable in said chamber in response to up and down movements of the vehicle wheels for subjecting the fluid to pressure, means providing a transfer passage through which fluid is displaced by operation of the piston, and flow control means associated with said passage for regulating the transfer of fluid therethrough in one direction comprising a pair of plate members in contact with each other, one of the members having an opening therethrough and the other member having a thin flexible portion covering said opening and adapted to be flexed to open position by pressure operating through the opening to thereby connect the opening and passage.

31. In a fluid flow shock absorber, valve means comprising a structure having first and second plate members in face to face surface contact with each other, and a third plate member associated therewith, said first member having an opening therethrough and being movable from a closed position to an open position in response to fluid pressure on one side of said structure and said second member having a portion thereof covering said opening and movable to an open position by pressure on the opposite side of said structure which acts through said opening and which tends to move said first member to its closed position, and said third member having a restricted opening disposed within the margin thereof and movable from a closed position to an open position in response to fluid pressure on one side thereof, said first and third members opening and closing, respectively, during the yielding movement of the vehicle spring to thereby confine the fluid flow through the restricted opening of said third member, and said first and third members closing and opening, respectively, during the rebound movement of the vehicle spring to thereby confine the fluid flow through the opening of said first member against the resistance offered by said second member.

32. In a fluid flow shock absorber, valve means comprising a structure having first and second plate members in contact with each other, and a third plate member associated therewith, said first member having an opening therethrough and being movable from a closed to an open position in response to fluid pressure on one side of said structure and the said second member having a thin flexible portion covering said opening and adapted to be flexed to open position by pressure on the opposite side of said structure which acts through said opening and which moves said first member to its closed position, and said third member having a restricted opening therethrough and being movable from a closed position to an open position in response to fluid pressure on one side thereof, said first and third members opening and closing, respectively, during the yielding movement of the vehicle spring to thereby confine the fluid flow through the restricted opening of said third member, and said first and third members closing and opening, respectively, during the rebound movement of the vehicle spring to thereby confine the fluid flow through the opening of said first member against the resistance offered by said flexible portion.

33. In a fluid flow shock absorber, the combination of a support having a passage through which fluid is moved and a seat associated with said passage, and a valve structure comprising a pair of plate members associated with said support, one of said members having an opening therethrough and being movable away from the other member in response to fluid pressure on one side of the structure and said other member having a yieldable portion associated with said opening and movable to an open position by pressure on the opposite side of said structure which acts through said opening and which tends to move said one member to its closed position.

34. In a fluid flow shock absorber, the combination of a support having a passage through which fluid is moved and a seat associated with said passage, and a valve structure comprising a pair of plate members associated with said support, one of said members having an opening therethrough and being movable away from the other member in response to fluid pressure on one side of the structure and said other member having a thin flexible portion associated with said opening and adapted to be flexed to open position by pressure on the opposite side of said structure which acts through said opening and which moves said one member to closed position.

DENNIS B. D. BLAKE.